W. L. FINNEY.
ROTARY DIVIDERS.
APPLICATION FILED MAY 24, 1915.

1,175,737.

Patented Mar. 14, 1916.

Witnesses
Frederick L. Fox.
P. M. Smith.

Inventor
W. L. Finney.
By Victor J. Evans.
Attorney

UNITED STATES PATENT OFFICE.

WILLIS L. FINNEY, OF ROSSVILLE, ILLINOIS.

ROTARY DIVIDERS.

1,175,737.  Specification of Letters Patent.  Patented Mar. 14, 1916.

Application filed May 24, 1915. Serial No. 30,108.

*To all whom it may concern:*

Be it known that I, WILLIS L. FINNEY, a citizen of the United States, residing at Rossville, in the county of Vermilion and State of Illinois, have invented new and useful Improvements in Rotary Dividers, of which the following is a specification.

This invention relates to rotary dividers, the object in view being to produce an instrument by means of which, for example, a mason or brick layer may quickly ascertain the number of courses of bricks necessary to attain a certain height of wall and for analogous uses, the instrument or device embodying in connection with a suitable frame, a rotary divider head, a circular series of marking pointers radiating from a common center, and means for adjusting said marking pointers radially with respect to the center of the head for increasing or diminishing the distance between the extremities of the points which are always maintained equidistantly from each other.

With the above and other objects in view, the invention consists in the novel construction, combination and arrangement of parts, as herein described, illustrated and claimed.

Figure 1:
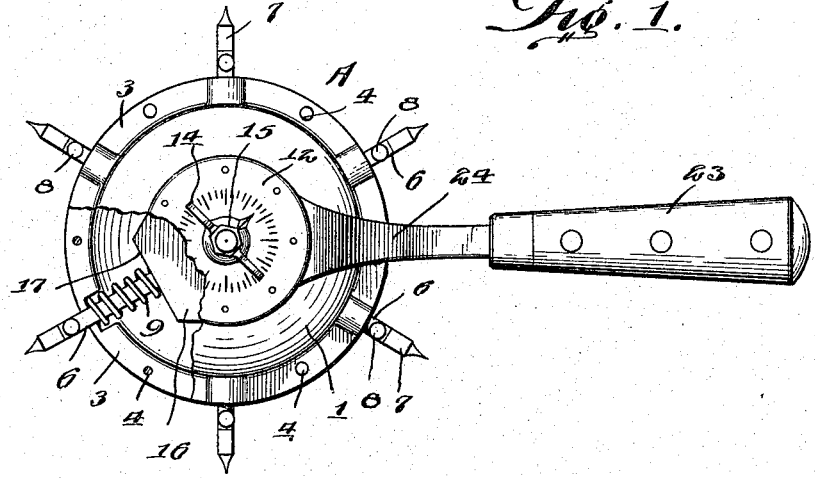
Figure 2:
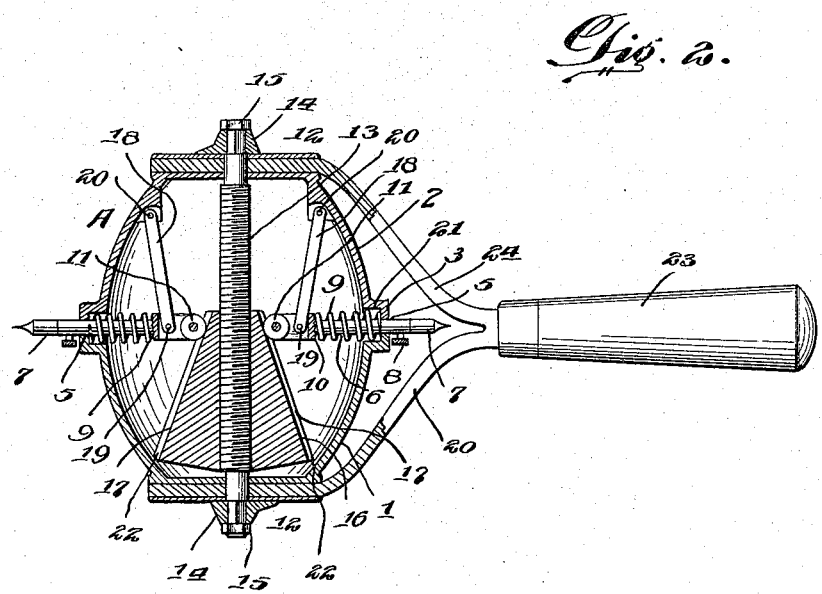

In the accompanying drawings: Figure 1 is a view partly in side elevation and partly in section illustrating the rotary divider of this invention. Fig. 2 is a section taken at right angles to Fig. 1 showing the feed screw and opposite points and springs in elevation.

The rotary divider contemplated in this invention embodies a casing designated generally at A and composed of sections 1 and 2 each substantially hemispherical as shown in Fig. 2, the sections being flanged as shown at 3 and fastened together by bolts 4 or the equivalent thereof.

The casing A is provided at intervals in the periphery thereof with guide openings 5 for a circular series of radially movable members 6 each of which is shown in the form of a rod and has its outer extremity formed with a longitudinal bore or socket to receive the shank of a detachable trammel or divider point 7 held in place by means of a binding screw 8. The divider points and the outer end portions of the point carriers or rods 6 project beyond the periphery of the casing A but are thrust inwardly by means of coiled expansion springs 9 bearing at their outer ends against the casing and at their inner ends against shoulders 10 one of which is formed on each member 6. Each member 6 carries at its inner end an anti-friction roller 11.

Disk-shaped heads 12 are provided at opposite sides of the casing, said heads forming bearings for a feed screw 13 which is journaled to turn in the bearings 12 and provided at both of its projecting extremities with means for turning said shaft, said means being illustrated as consisting of winged nuts 14 held in place by suitable fasteners 15.

Threaded upon the feed screw 13 is a spreader 16 having a generally frusto-conical shape or made tapering from one end to the other, the spreader being polygonal in cross section thereby providing said spreader with a plurality of working faces 17 against which one of the rollers 11 travels as the spreader 16 is moved inwardly and outwardly by operating the feed screw 13. Guide links 18 are pivotally connected to the members 6 at 19 and are pivotally connected at 20 to the casing, the guide openings 5 being flared as at 21 to enable the point carriers to assume different angles as they move inwardly and outwardly, the points, however, always remaining in a common circumferential plane. The rollers 11 are held in contact with the spreader 16 by means of the springs 9. If desired, each of the working faces 17 of the spreader may be provided with parallel ribs 22 between which the adjacent roller 11 moves, all of the rollers thus contributing to prevent rotation of the spreader 16.

23 designates a handle for operating the rotary divider, said handle being connected to the supporting frame of the rotary head A and comprising the divergent members 24 which are connected at their divergent extremities to the stationary heads 12 at opposite sides of the rotary divider head A.

From the foregoing description, the operation of the divider will now be clearly understood. As the device is rolled along a given surface, the divider points prick or otherwise mark the surface and the operator thus ascertains how many times the space or distance between the divider points occurs in a given distance. For example, a mechanic measures the height of a window or door opening or frame, lays off the measurement on a strip of wood and then starting with one of the divider points on the initial mark on said strip of wood, pushes or pulls the rotary divider until it reaches the final mark on the strip of wood. If the last mark formed by the rotary divider underreaches or overreaches the final mark on the strip of wood, he turns the feed screw 13 thereby shifting the divider points outwardly or inwardly and correspondingly increasing or decreasing the distance between said points until they will tally with the initial and final mark on the wooden strip. The mechanic will then know the proper thickness for the mortar joints between the courses of bricks in order that the last course shall come even with the top of such door or window opening or frame.

The instrument hereinabove described may be used for spacing or dividing off different material such as siding or weatherboarding and bricks or building blocks of different sizes. Longer or shorter divider or trammel points may be used according to requirements. When not in use, the points 7 may be removed from their carriers so as to prevent injury thereto.

What I claim is:—

1. A rotary divider comprising a revoluble head, a frame in which said head is journaled, a series of equally spaced divider points radiating from a common center coincident with the axis of said head and carried by the latter, means for uniformly projecting and retracting said points, embodying a generally cone-shaped point spreader, springs acting to thrust said points inwardly, and pivotal point guiding links connecting said points and head.

2. A rotary divider comprising a revoluble head, a frame in which said head is journaled, a series of equally spaced divider points radiating from a common center coincident with the axis of said head and carried by the latter, means for uniformly projecting and retracting said points, embodying a generally cone-shaped point spreader, and a rotatable feed screw for advancing and retracting said spreader.

3. A rotary divider comprising a revoluble head, a frame in which said head is journaled, a series of equally spaced divider points radiating from a common center coincident with the axis of said head and carried by the latter, means for uniformly projecting and retracting said points, embodying a tapering spreader polygonal in cross section to provide a plurality of flat inclined faces which act on the points and prevent the spreader from turning, and means for feeding said spreader.

In testimony whereof I affix my signature in presence of two witnesses.

WILLIS L. FINNEY.

Witnesses:
JOHN E. GRAHAM,
EDWARD CORNELL.

Copies of this patent may be obtained for five cents each, by addressing the "Commissioner of Patents, Washington, D. C."